(12) United States Patent
Viturro et al.

(10) Patent No.: US 8,014,024 B2
(45) Date of Patent: Sep. 6, 2011

(54) GRAY BALANCE FOR A PRINTING SYSTEM OF MULTIPLE MARKING ENGINES

(75) Inventors: R. Enrique Viturro, Rochester, NY (US); Lalit Keshav Mestha, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1857 days.

(21) Appl. No.: 11/070,681

(22) Filed: Mar. 2, 2005

(65) Prior Publication Data

US 2006/0197966 A1    Sep. 7, 2006

(51) Int. Cl.
G06F 15/00 (2006.01)
H04N 1/46 (2006.01)
G03F 3/08 (2006.01)

(52) U.S. Cl. ............... 358/1.9; 358/504; 358/518
(58) Field of Classification Search .................. None
See application file for complete search history.

(56) References Cited

U.S. PATENT DOCUMENTS

| | | |
|---|---|---|
| 4,473,298 A | 9/1984 | Sakamoto |
| 4,516,175 A | 5/1985 | Jung et al. |
| 4,579,446 A | 4/1986 | Fujino et al. |
| 4,587,532 A | 5/1986 | Asano |
| 4,836,119 A | 6/1989 | Siraco et al. |
| 5,004,222 A | 4/1991 | Dobashi |
| 5,080,340 A | 1/1992 | Hacknauer et al. |
| 5,095,342 A | 3/1992 | Farrell et al. |
| 5,159,395 A | 10/1992 | Farrell et al. |
| 5,208,640 A | 5/1993 | Horie et al. |
| 5,272,511 A | 12/1993 | Conrad et al. |
| 5,326,093 A | 7/1994 | Sollitt |
| 5,435,544 A | 7/1995 | Mandel |
| 5,473,419 A | 12/1995 | Russel et al. |
| 5,489,969 A | 2/1996 | Soler et al. |
| 5,504,568 A | 4/1996 | Saraswat et al. |
| 5,508,826 A * | 4/1996 | Lloyd et al. .................. 358/501 |
| 5,525,031 A | 6/1996 | Fox |
| 5,557,367 A | 9/1996 | Yang et al. |
| 5,559,606 A * | 9/1996 | Webster et al. ............... 358/296 |
| 5,568,246 A | 10/1996 | Keller et al. |
| 5,570,172 A | 10/1996 | Acquaviva |
| 5,596,416 A | 1/1997 | Barry et al. |
| 5,629,762 A | 5/1997 | Mahoney et al. |

(Continued)

OTHER PUBLICATIONS

Best RemoteProof(tm) Comunicate Color (c) 2002 Best Gmbh pp. 1-2.*

(Continued)

*Primary Examiner* — Twyler Haskins
*Assistant Examiner* — Barbara Reinier
(74) *Attorney, Agent, or Firm* — Fay Sharpe LLP (57) ABSTRACT

A method for calibrating a printing system including a plurality of printers includes designating one of the plurality of printers as a reference printer and defining color values for a desired response for one or more printed test patches on a control page. Through a first process aimed toward achieving the desired response, a printed control page is generated with the reference printer, the control page including one or more of the test patches which, when measured, has a measured response which approaches the desired response. Through a second process aimed toward achieving a desired response, the desired response being the measured response of the reference printer, a printed control page is generated with a second of the printers, the control page including one or more of the test patches which, when measured, has a response which approaches the measured response of the reference printer.

18 Claims, 5 Drawing Sheets

U.S. PATENT DOCUMENTS

| | | | |
|---|---|---|---|
| 5,710,968 A | 1/1998 | Clark et al. | |
| 5,748,221 A | 5/1998 | Castelli et al. | |
| 5,748,330 A | 5/1998 | Wang et al. | |
| 5,764,369 A * | 6/1998 | Farrell et al. | 358/296 |
| 5,778,377 A | 7/1998 | Marlin et al. | |
| 5,784,667 A | 7/1998 | Mestha et al. | |
| 5,790,281 A | 8/1998 | Knox et al. | |
| 5,818,960 A * | 10/1998 | Gregory et al. | 382/167 |
| 5,884,910 A | 3/1999 | Mandel | |
| 5,956,469 A * | 9/1999 | Liu et al. | 358/1.9 |
| 5,995,721 A | 11/1999 | Rourke et al. | |
| 6,008,907 A * | 12/1999 | Vigneau et al. | 358/1.9 |
| 6,026,216 A * | 2/2000 | Ohtsuka et al. | 358/1.9 |
| 6,027,201 A * | 2/2000 | Edge | 347/19 |
| 6,059,284 A | 5/2000 | Wolf et al. | |
| 6,075,614 A * | 6/2000 | Ohtsuka et al. | 358/1.1 |
| 6,125,248 A | 9/2000 | Moser | |
| 6,157,469 A | 12/2000 | Mestha | |
| 6,205,246 B1 * | 3/2001 | Usami | 382/167 |
| 6,219,155 B1 * | 4/2001 | Zuber | 358/1.9 |
| 6,241,242 B1 | 6/2001 | Munro | |
| 6,297,886 B1 | 10/2001 | Cornell | |
| 6,301,383 B1 * | 10/2001 | Ito et al. | 382/162 |
| 6,341,773 B1 | 1/2002 | Aprato et al. | |
| 6,345,117 B2 | 2/2002 | Klassen | |
| 6,351,308 B1 | 2/2002 | Mestha | |
| 6,381,037 B1 | 4/2002 | Balasubramanian et al. | |
| 6,384,918 B1 | 5/2002 | Hubble, III et al. | |
| 6,404,511 B1 * | 6/2002 | Lin et al. | 358/1.9 |
| 6,441,923 B1 | 8/2002 | Balasubramanian et al. | |
| 6,450,711 B1 | 9/2002 | Conrow | |
| 6,476,376 B1 | 11/2002 | Biegelsen et al. | |
| 6,476,923 B1 | 11/2002 | Cornell | |
| 6,484,631 B2 | 11/2002 | Degani et al. | |
| 6,493,098 B1 | 12/2002 | Cornell | |
| 6,537,910 B1 | 3/2003 | Burke et al. | |
| 6,550,762 B2 | 4/2003 | Stoll | |
| 6,554,276 B2 | 4/2003 | Jackson et al. | |
| 6,567,170 B2 | 5/2003 | Tandon et al. | |
| 6,577,826 B1 | 6/2003 | Misaizu et al. | |
| 6,577,925 B1 | 6/2003 | Fromherz | |
| 6,607,320 B2 | 8/2003 | Bobrow et al. | |
| 6,608,988 B2 | 8/2003 | Conrow | |
| 6,612,566 B2 | 9/2003 | Stoll | |
| 6,612,571 B2 | 9/2003 | Rider | |
| 6,621,576 B2 | 9/2003 | Tandon et al. | |
| 6,633,382 B2 | 10/2003 | Hubble, III et al. | |
| 6,639,669 B2 | 10/2003 | Hubble, III et al. | |
| 6,760,056 B2 | 7/2004 | Klassen et al. | |
| 6,775,029 B1 | 8/2004 | Wen et al. | |
| 6,819,906 B1 | 11/2004 | Herrmann et al. | |
| 6,925,283 B1 | 8/2005 | Mandel et al. | |
| 6,959,165 B2 | 10/2005 | Mandel et al. | |
| 7,027,182 B1 * | 4/2006 | Soler | 358/1.9 |
| 7,027,187 B1 * | 4/2006 | Zuber | 358/1.9 |
| 7,295,703 B2 * | 11/2007 | Bala et al. | 382/165 |
| 7,355,752 B2 * | 4/2008 | Sharma et al. | 358/1.9 |
| 7,355,753 B2 * | 4/2008 | Yao | 358/1.9 |
| 2001/0013940 A1 * | 8/2001 | Mayer et al. | 358/1.9 |
| 2001/0033686 A1 | 10/2001 | Klassen | |
| 2002/0067849 A1 | 6/2002 | Klassen et al. | |
| 2002/0078012 A1 | 6/2002 | Ryan et al. | |
| 2002/0103559 A1 | 8/2002 | Gartstein | |
| 2002/0149799 A1 * | 10/2002 | Hayashi | 358/406 |
| 2002/0191183 A1 | 12/2002 | Tandon et al. | |
| 2003/0025924 A1 * | 2/2003 | Lammens et al. | 358/1.9 |
| 2003/0025925 A1 * | 2/2003 | Elsman et al. | 358/1.9 |
| 2003/0050768 A1 | 3/2003 | Mestha et al. | |
| 2003/0055611 A1 | 3/2003 | Mestha et al. | |
| 2003/0063302 A1 | 4/2003 | Munger et al. | |
| 2003/0077095 A1 | 4/2003 | Conrow | |
| 2003/0081214 A1 | 5/2003 | Mestha et al. | |
| 2003/0085941 A1 * | 5/2003 | Tezuka et al. | 347/19 |
| 2003/0132982 A1 | 7/2003 | Tandon et al. | |
| 2003/0164960 A1 * | 9/2003 | Housel | 358/1.9 |
| 2003/0202822 A1 | 10/2003 | Viturro et al. | |
| 2004/0012817 A1 | 1/2004 | Brewington et al. | |
| 2004/0042021 A1 * | 3/2004 | Wu et al. | 358/1.9 |
| 2004/0046820 A1 * | 3/2004 | Wu et al. | 347/19 |
| 2004/0070775 A1 * | 4/2004 | Yao et al. | 358/1.9 |
| 2004/0070776 A1 | 4/2004 | Yao et al. | |
| 2004/0085561 A1 | 5/2004 | Fromherz | |
| 2004/0085562 A1 | 5/2004 | Fromherz | |
| 2004/0088207 A1 | 5/2004 | Fromherz | |
| 2004/0114164 A1 | 6/2004 | Linder et al. | |
| 2004/0136013 A1 * | 7/2004 | Mestha et al. | 358/1.9 |
| 2004/0136015 A1 | 7/2004 | Van de Capelle et al. | |
| 2004/0141193 A1 | 7/2004 | Mestha | |
| 2004/0150156 A1 | 8/2004 | Fromherz et al. | |
| 2004/0150158 A1 | 8/2004 | Biegelsen et al. | |
| 2004/0153983 A1 | 8/2004 | McMillan | |
| 2004/0165199 A1 | 8/2004 | Klassen et al. | |
| 2004/0216002 A1 | 10/2004 | Fromherz et al. | |
| 2004/0225391 A1 | 11/2004 | Fromherz et al. | |
| 2004/0225394 A1 | 11/2004 | Fromherz et al. | |
| 2004/0239935 A1 * | 12/2004 | Kitazawa | 356/406 |
| 2004/0246528 A1 | 12/2004 | Washio et al. | |
| 2004/0247365 A1 | 12/2004 | Lofthus et al. | |
| 2004/0252905 A1 | 12/2004 | Mizes et al. | |
| 2004/0257595 A1 | 12/2004 | Sharma et al. | |
| 2004/0264768 A1 | 12/2004 | Sharma et al. | |
| 2004/0264769 A1 | 12/2004 | Sharma et al. | |
| 2004/0264770 A1 | 12/2004 | Sharma et al. | |
| 2004/0264771 A1 | 12/2004 | Sharma et al. | |
| 2005/0036159 A1 | 2/2005 | Sharma et al. | |
| 2005/0052668 A1 * | 3/2005 | Hoshino | 358/1.9 |
| 2005/0071104 A1 * | 3/2005 | Viturro et al. | 702/85 |
| 2005/0088672 A1 * | 4/2005 | Johnson | 358/1.9 |
| 2005/0200902 A1 * | 9/2005 | Mahy | 358/3.23 |
| 2006/0007510 A1 * | 1/2006 | Nishide et al. | 358/518 |

OTHER PUBLICATIONS

Morgan, P.F., "Integration of Black Only and Color Printers", Xerox Disclosure Journal, vol. 16, No. 6, Nov./Dec. 1991, pp. 381-383.
Desmond Fretz, "Cluster Printing Solution Announced", Today at Xerox (TAX), No. 1129, Aug. 3, 2001.
U.S. Appl. No. 10/761,522, filed Jan. 21, 2004, Mandel et al.
U.S. Appl. No. 10/785,211, filed Feb. 24, 2004, Lofthus et al.
U.S. Appl. No. 10/881,619, filed Jun. 30, 2004, Bobrow.
U.S. Appl. No. 10/917,676, filed Aug. 13, 2004, Lofthus et al.
U.S. Appl. No. 10/917,768, filed Aug. 13, 2004, Lofthus et al.
U.S. Appl. No. 10/924,106, filed Aug. 23, 2004, Lofthus et al.
U.S. Appl. No. 10/924,113, filed Aug. 23, 2004, deJong et al.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,326, filed Nov. 30, 2004, Grace et al.
U.S. Appl. No. 10/999,450, filed Nov. 30, 2004, Lofthus et al.
U.S. Appl. No. 11/000,158, filed Nov. 30, 2004, Roof.
U.S. Appl. No. 11/000,168, filed Nov. 30, 2004, Biegelsen et al.
U.S. Appl. No. 11/000,258, filed Nov. 30, 2004, Roof.
U.S. Appl. No. 11/001,890, filed Dec. 2, 2004, Lofthus et al.
U.S. Appl. No. 11/051,817, filed Feb. 4, 2005, Moore et al.
U.S. Appl. No. 11/069,020, filed Feb. 28, 2005, Lofthus et al.
U.S. Appl. No. 10/945,600, filed Sep. 20, 2004, Yao.
U.S. Appl. No. 11/136,821, filed May 25, 2005, Robinson.
U.S. Appl. No. 11/170,873, filed Jun. 30, 2005, Klassen.
U.S. Appl. No. 11/170,975, filed Jun. 30, 2005, Klassen.
U.S. Appl. No. 11/268,294, filed Nov. 4, 2005, Klassen.
U.S. Appl. No. 11/274,638, filed Nov. 15, 2005, Wu et al.
U.S. Appl. No. 11/287,177, filed Nov. 23, 2005, Mandel et al.
U.S. Appl. No. 11/291,860, filed Nov. 30, 2005, Willis.
U.S. Appl. No. 11/292,163, filed Nov. 30, 2005, Mandel et al.
U.S. Appl. No. 11/292,388, filed Nov. 30, 2005, Mueller.
U.S. Appl. No. 11/314,774, filed Dec. 21, 2005, Klassen.
U.S. Appl. No. 11/315,045, filed Dec. 22, 2005, Klassen.
Keith Knox, "Integrating Cavity Effect in Scanners," Proceedings on IS&T/OSA Conference on Optics and Imaging in the Information Age, Rochester, pp. 156-158 (1996).
G. Sharma, S. Wang, D. Sidavanahalli and K. Knox, "The Impact of UCR on Scanner Calibration," in Proc PICS Conf., pp. 121-124, Portland, OR (1998).

H. Haneishi, T. Hirao, A. Shimazu and Y. Miyake, "Colorimetric Precision in Scanner Calibration Using Matrices," in Proceedings of IS&T and SID'S 3$^{rd}$ Color Imaging Conference: Color Science, Systems and Applications, pp. 106-108, Scottsdale, Arizona (Nov. 1995).

A.R. Rao, "Color Calibration of a Colorimetric Scanner Using Non-Linear Least Squares," in Proc. IS&T's 1998 PICS Conference, Portland, OR (May 1998).

V. Ostromoukhov, R.D. Hersch, C. Peraire, P. Emmel and I. Amidror, "Two Approaches in Scanner-Printer Calibration: Colorimetric Space-Based vs. Closed-Loop," in Proc SPIE 2170, pp. 133-142 (1994).

J. Hardeberg, "Desktop Scanning to sRGB," in IS&T and SPIE's Device Independent Color, Color Hardcopy and Graphic Arts V, San Jose, CA (Jan. 2000).

J. Hardeberg, "Acquisition and Reproduction of Colour Images: Colorimetric and Multispectral Approaches," Doctoral Dissertation, l'Ecole Nationale Superieure des Telecommunications, Paris (1999).

* cited by examiner

2-PAGE JOB - 2 MARKING ENGINE

| | 1-2 | PAGES, OUTPUT TO TRAY 52 |
|---|---|---|
| | T | TARGET, OUTPUT TO PURGE TRAY 56 |

| | | | | | | | | | | | | |
|---|---|---|---|---|---|---|---|---|---|---|---|---|
| IME_1 | 1 | 1 | 1 | 1 | T | 2 | 2 | 2 | 1 | 1 | 1 | .... |
| IME_2 | 2 | 2 | 2 | 2 | 1 | 1 | 1 | T | 2 | 2 | 2 | .... |

FIG. 5

4-PAGE JOB - 4 MARKING ENGINE

| | 1-2-3-4 | PAGES, OUTPUT TO TRAY 52 |
|---|---|---|
| | T | TARGET, OUTPUT TO PURGE TRAY 56 |

| | | | | | | | | | | | | |
|---|---|---|---|---|---|---|---|---|---|---|---|---|
| IME_1 | 1 | 1 | T | 4 | 3 | 2 | 1 | 1 | 1 | 1 | 1 | .... |
| IME_2 | 2 | 2 | 1 | T | 4 | 3 | 2 | 2 | 2 | 2 | 2 | .... |
| IME_3 | 3 | 3 | 2 | 1 | T | 4 | 3 | 3 | 3 | 1 | 1 | .... |
| IME_4 | 4 | 4 | 3 | 2 | 1 | T | 4 | 4 | 4 | 4 | 4 | .... |

FIG. 6

5-PAGE JOB - 4 MARKING ENGINE

| | 1-2-3-4-5 | PAGES, OUTPUT TO TRAY 52 |
|---|---|---|
| | T | TARGET, OUTPUT TO PURGE TRAY 56 |

| | | | | | | | | | | | | |
|---|---|---|---|---|---|---|---|---|---|---|---|---|
| IME_1 | 1 | 5 | T | 2 | 5 | 3 | 1 | 5 | 4 | 3 | 2 | .... |
| IME_2 | 2 | 1 | 4 | T | 1 | 4 | 2 | 1 | 5 | 4 | 3 | .... |
| IME_3 | 3 | 2 | 5 | 3 | T | 5 | 3 | 2 | 1 | 5 | 4 | .... |
| IME_4 | 4 | 3 | 1 | 4 | 2 | T | 4 | 3 | 2 | 1 | 5 | .... |

FIG. 7

GRAY BALANCE FOR A PRINTING SYSTEM OF MULTIPLE MARKING ENGINES

CROSS REFERENCE TO RELATED PATENTS AND APPLICATIONS

The following applications, the disclosures of each being totally incorporated herein by reference are mentioned:

U.S. application Ser. No. 09/566,291, filed May 5, 2000, entitled: "On-Line Calibration System for a Dynamically Varying Color Marking Device," by Mestha et al.;

U.S. application Ser. No. 10/673,688 filed Sep. 29, 2003, entitled: "A Method for Calibrating a Marking System to Maintain Color Output Consistency Across Multiple Printers," by Viturro et al.; and U.S. application Ser. No. 09/487,586, filed Jan. 19, 2000, by Mestha, et al., entitled "Methods for Producing Device and Illumination Independent Color Reproduction."

BACKGROUND

The present embodiment relates to color consistency and gray balance calibration in an integrated printing system. It finds particular application in conjunction with a system for increasing the consistency between the outputs of multiple marking engines, and will be described with particular reference thereto. However, it is to be appreciated that the present embodiment is also amenable to other like applications.

In general, computers and other electronic equipment generating and inputting color images or documents typically generate three-dimensional or RGB (red, green, blue) color signals. Electrographic devices, such as printers, copiers, and the like, however, often print in four-dimensional or CMYK (cyan, magenta, yellow, and black) colors (and often can also receive such signals as input). A look-up table is commonly provided to convert each digital RGB color signal value to a corresponding digital CMYK value before or after being received by the printer. Due to the nature of printing inks, and their light absorption characteristics, however, complex non-linear colorimetric relationships exist between the input and output values. Typically, a color correction look-up table is built which approximates the mapping between RGB colorimetric space and CMYK values. The color correction look-up table may be generated by sending a set of CMYK digital values to the printer, measuring the colorimetric RGB values of the resulting color patches outputted by the printer, and generating the look-up table from the difference between the inputted values and the measured outputted values. More specifically, the color correction look-up table corrects for non-linearities, printing parameter variations, and unwanted absorptions of inks, so that the printer will print the true corresponding color. The color of the patches is typically measured with a high accuracy spectrophotometer, or the like. Such systems are described, for example, in U.S. Pat. No. 6,157,469 to Mestha; U.S. Pat. No. 6,384,918 to Hubble, III, et al.; U.S. Pat. No. 6,584,435 to Mestha et al.; U.S. Pat. No. 6,721,692 to Mestha et al.; above-referenced application Ser. Nos. 10/673,688 and 09/487,586, the disclosures of which are incorporated herein in their entireties by reference.

Over time, the output of conventional printers drifts (or deviates from predetermined optimum standards) due to various factors. These factors include environmental conditions (temperature, relative humidity, etc.), use patterns, the type of media (e.g., different paper types, transparencies, etc.) used, variations in media, variations from original models used in initialization, general wear, etc. To correct for the drift, the system is adjusted or recalibrated periodically. Recalibrating the color correction table involves periodically printing and remeasuring a set of test color patches which are then compared to an original set of color patches by calibration software.

Spectrophotometers have been used in a feedback loop of an on-line color correction system. Such a spectrophotometer may be periodically recalibrated, to ensure its accuracy, as described, for example, in U.S. Pat. Nos. 6,157,469 and 6,351,308 to Mestha, the disclosures of which are incorporated herein in their entireties, by reference. Calibration systems of this type use a reduced (smaller) number of color patch samples, printed at intervals during the regular printing operation of the printer, yet still provide relatively substantially continuous updating correction of the printer's color renditions over a wide or substantially complete color spectra.

U.S. application Ser. No. 09/566,291, noted above, discloses an apparatus for automatically calibrating a digital printing system. The apparatus utilizes a limited dynamic color balance control system using an in-line spectrophotometer color measurement system in the output path of a color printer for measuring colors on printed test sheets/banner pages without requiring manual operation or operator input. The automatic color balance control system produces tone values for all four primary colors by printing patches, measuring colors and automatically readjusting the tone reproduction curves until a satisfactory level of accuracy is obtained. While producing color balanced Tone Reproduction Curves (TRCs), the system will automatically lock the printer output to some predetermined color patch targets. In one embodiment, this output is locked to neutral gray when target colors are set to neutral gray inside the digital front end (DFE). After converging to the targets, the control system will return full TRCs for use inside the normal print path. The process is enabled either by the system controller or by the user with minimal intrusion. The control system uses control algorithms to achieve greater accuracy in the presence of uncertainties in the printing system.

Systems which employ several small printers are now being developed. These systems enable high overall outputs to be achieved by printing portions of the same document on multiple printers. Such systems are commonly referred to as "tandem engine" printers, "parallel" printers, or "cluster printing" (in which an electronic print job may be split up for distributed higher productivity printing by different printers, such as separate printing of the color and monochrome pages and are then recombined to form a document.

The eye is sensitive to color and gray balance variations in printer outputs, particularly when the outputs form facing pages in a document. Thus even small differences between outputs from different printers which are destined to be closely positioned within a document can be considered a defect. To add to the complexity of color matching between color image forming devices, different color image forming devices can use different types of toners, dyes, pigments, or inks to produce the outputted color images. Likewise, the color images can be produced on a wide range of copy media. Images can be produced, for example, on copy media ranging from paper to plastic, from fabric to metal. In each case, each combination of colorant and media produces a different optical appearance.

In an attempt to solve the problem of color matching of pages produced by different printers, various color matching techniques have been developed that use models to translate colors from one color space to another color space. These models usually manifest themselves in the form of predetermined multi-dimensional look-up tables.

REFERENCES

U.S. Pat. No. 6,757,076 to Mestha, et al., incorporated herein by reference, discloses a device independent color control (DICC) server that provides spectral or colorimetric matching of images printed on different color printers. The color printers each have their own color sensor, positioned to measure a color quality of an output image formed by that printer.

U.S. Pat. No. 6,548,435 to Mestha, et al., incorporated herein by reference, discloses systems and methods for determining spectra using dynamic Karhunen-Loeve algorithms with measurements from an LED color sensor.

U.S. Pat. No. 6,721,692 to Mestha, et al., incorporated herein by reference, discloses systems and methods for determining spectra using dynamic least squares algorithms with measurements from an LED color sensor.

BRIEF DESCRIPTION

In accordance with aspects of the present exemplary embodiment, a system and method for calibrating a printing system are provided. The method includes designating one of a plurality of printers as a reference printer and defining color values for a desired response for one or more printed test patches on a control page. Through a first process aimed toward achieving the desired response, a printed control page is generated with the reference printer, the control page including one or more of the test patches which, when measured, has a measured response which approaches the desired response. Through a second process aimed toward achieving a desired response, the desired response, in this case, being the measured response of the reference printer, a printed control page is generated with a second of the printers. The control page includes one or more of the test patches which, when measured, has a response which approaches the measured response of the reference printer.

The printing system may include a plurality of printers including a reference printer, a finisher, a network of paper paths which connects the plurality of printers with the finisher, a reflectance system which receives printed pages from the plurality of printers and determines a color value response for test patches on the printed pages, and a computer implemented system. The computer implemented system generates a printed control page with the reference printer, the control page including one or more test patches, compares a color value response of the one or more test patches with a desired color value response, modifies a tone reproduction curve of the reference printer with the aim of matching the desired color value response, generates at least one additional control page, generates a measured response for a test patch of the control page which approaches the desired color value response, and modifies a tone reproduction curve of a second of the printers with the aim of matching the measured response of the reference printer.

The term "independent marking engine" or "printer," as used herein broadly encompasses a print engine or copier, xerographic or otherwise, capable of applying an image to print media, unless otherwise defined in a claim.

A "printing assembly," as used herein incorporates a plurality of printers, and may include other components, such as finishers, paper feeders, and the like, which may all be under the control of a common control system.

A "print job" or "document" is normally a set of related sheets, usually one or more collated copy sets copied from a set of original print job sheets or electronic document page images, from a particular user, or otherwise related.

A "finisher," as broadly used herein, is any post-printing accessory device, in which printed media from two or more printers is combined, such as an inverter, reverter, sorter, mailbox, inserter, interposer, folder, stapler, stacker, collater, stitcher, binder, over-printer, or the like.

The term "print medium" herein refers to a usually flimsy physical sheet of paper, plastic, or other suitable physical print media substrate for images, whether precut or web fed. Printed sheets may be referred to as "output" or "printed media."

The term "spectrophotometer" is intended to encompass spectrophotometers and colorimeters, as broadly defined herein, unless otherwise defined in a claim.

DETAILED DESCRIPTION

Figure 1:
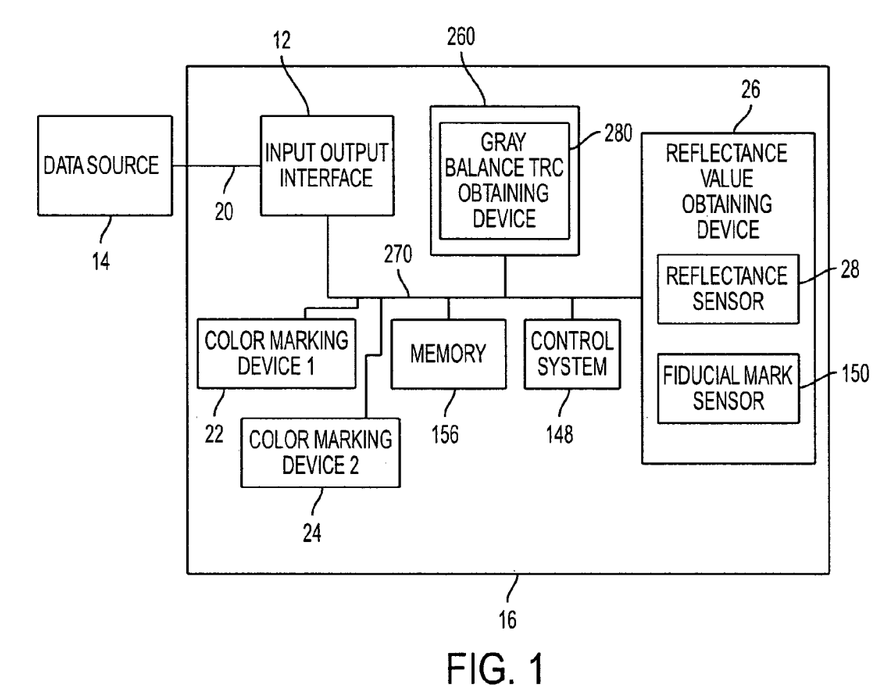
FIG. 1 is a functional block diagram illustrating an exemplary parallel printing system.

With reference to FIG. 1, an exemplary digital parallel printing system 10 includes an input/output interface in the form of a print server 12, which receives image data from a locally or remotely located computer, computer network, scanner, digital camera, or other data source 14 capable of generating an electronic image or text data, and a printing assembly 16 capable of printing onto a print medium, all interconnected by links 20. The links 20 can be a wired or wireless link or other means capable of supplying electronic data to and/or from the connected elements. The parallel printing system 10 includes a plurality of integrated marking engines (printers) 22, 24 referred to herein as printers, and a reflectance value obtaining device 26 including at least one sensor 28. The sensor 28 may include an in-line spectrophotometer for calibrating the digital printing system, either automatically or partially manually. The sensor is disposed in the output path of one or more of the printers 22, 24 for measuring colors on printed test sheets/banner pages. Printers 22, 24 are capable of reproducing images or text received from data source 14 by causing a marking medium, such as ink, toner or the like, to be arranged in appropriate configurations on a substrate.

The printing system may incorporate "tandem engine" printers, "parallel" printers, "cluster printing," "output merger" or "interposer" systems, and the like, as disclosed, for example, in U.S. Pat. Nos. 4,579,446 to Fujino, et al.; 4,587,532 to Asano; 5,489,969 to Soler, et al.; 5,568,246 to keller, et al.; 5,570,172 to Acquaviva; 5,596,416 to Barry, et al.; 5,995,721 to Rourke, et al.; 6,554,276 to Jackson, et al., 6,654,136 to Shimida; 6,607,320 to Bobrow, et al.; and in copending U.S. application Ser. No. 10/924,459, filed Aug. 23, 2004, for Parallel Printing Architecture Using Image Marking Engine Modules by Mandel, et al., and application Ser. No. 10/917,768, filed Aug. 13, 2004, for Parallel Printing Architecture Consisting of Containerized Image Marking Engines and Media feeder Modules, by Robert Lofthus, the disclosures of all of these references being incorporated herein by reference.

A typical parallel printing system is one which feeds paper from a common paper stream to a plurality of printers, which may be horizontally and/or vertically stacked. Printed media from the various printers is then conveyed from the printers to a common finisher where the sheets associated with a single print job are assembled.

In FIG. 1, two printers 22, 24, are illustrated, which print using the same marking media, such as inks or toners. The printers 22, 24 may be of the same modality (e.g., black (K), custom color (C), process color (P) or of different print modalities. In the illustrated embodiment, printers 22 and 24 are process color printers which are input CMYK and print in an L*, a*, b* design space. Although only two printers are shown, it will be appreciated that fewer or more printers, of the same or different print modalities, such as three, four, or more printers, may be associated with a single print server. The printers may be capable of generating more than one type of print modality, for example, black and process color.

Figure 2:
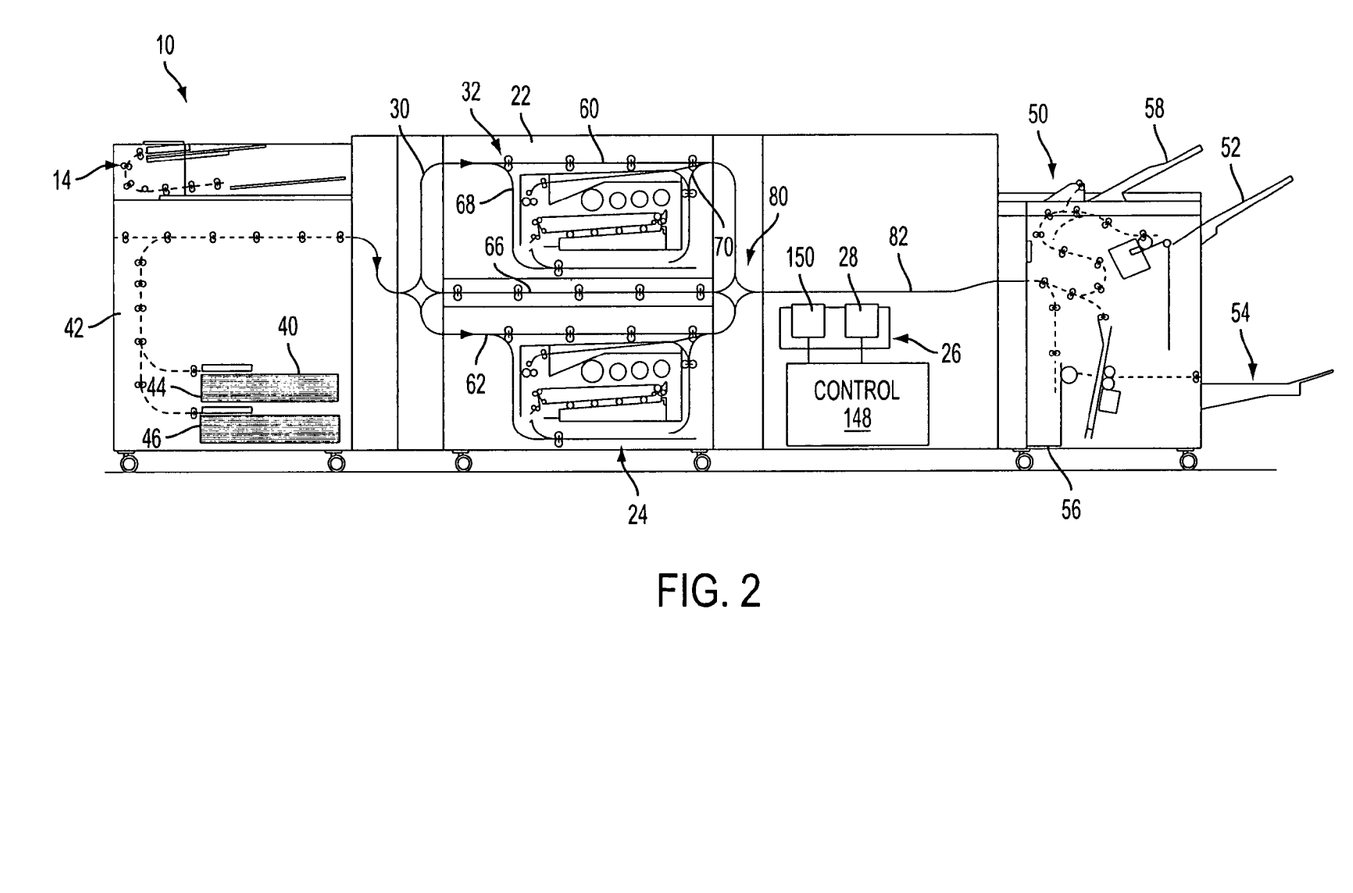
FIG. 2 is a schematic side view of a parallel printing system including a reflectance value obtaining device according to a first embodiment.

With reference now to FIG. 2, a schematic side view of a parallel printing system 10 (here illustrated as a copier) includes a media transporting system 30, such as a network of flexible paper pathways, which feeds to and collects print media from each of the printers 22, 24. The paper pathways may include a plurality of drive elements, illustrated as pairs of rollers 32, although other drive elements are also contemplated. At any one time, a plurality of the printers 22, 24 can be printing. More than one of the printers can be employed in printing a single print job. More than one print job can be in the course of printing at any one time.

The printers 22, 24 may be fed with print media 40 from a single high speed and capacity feeder module 42 including a plurality of print media sources 44, 46, although it will be appreciated that one or more of the printers may be fed from one or more separate feeders. The print media sources 44, 46 may be loaded with print media 40 of different types. A finisher 50 with one or more separate finishing capabilities, here represented by output trays 52, 54 receives printed media from any one or more of the stacked printers 22, 24. Job output trays 52, 54 may include one or more special trays for multiple job collections. Finisher 50 also includes a purge media tray 56 and output media tray 58, which are used for diverting printing control sheets during printing jobs while maintaining the integrity of the print jobs.

As illustrated in FIG. 2, the media handling system 30 is configured for transporting of test color patches from each of the printers 22, 24 to the reflectance sensor 28 for performing an evaluation of the printers' color renditions.

The media handling system 30 includes a downstream print media highway or highways 60, 62 which extends from the feeder module 42 to the finisher module 50 and may include one or more upstream print media highways 66, by which media which has been output by one printer, such as printer 22, can be returned to printer 22 or sent to printer 24 for overprinting. Pathways 68, 70 feed the print media between the downstream media highways 60, 62 and selected ones of the printers. For example, in printing a two page document, page one of the document may be sent to printer 22 and page two to printer 24, where pages one and two may be formed on opposite sides of the same sheet or on separate sheets. Thereafter, these sheets are sent to finisher 50 in sequential ways such that the output maintains the integrity of the print job.

The highway(s) 60, 62, 66 and/or pathways 68, 70 may include inverters, reverters, interposers, bypass pathways, and the like as known in the art to direct the print substrate between the highway and a selected printer or between two printers. It will be appreciated that the printers may be duplex or simplex printers and that a single sheet of paper may be marked by two or more of the printers or marked a plurality of times by the same printer, before reaching the finisher 50 FIG. 2 illustrates the printers 22, 24 vertically stacked although it is to be appreciated that the printers may be stacked horizontally.

The highways 60, 62 converge at 80 from whence a single highway 82 carries the printed paper past the reflectance value obtaining device 26 to the finisher 50. Although each of the printers 22 is shown linked to the reflectance value obtaining device 26 by the same highway 82, it is to be appreciated that the printers may alternatively be linked by separate pathways to the reflectance value obtaining device 26.

Figure 3:
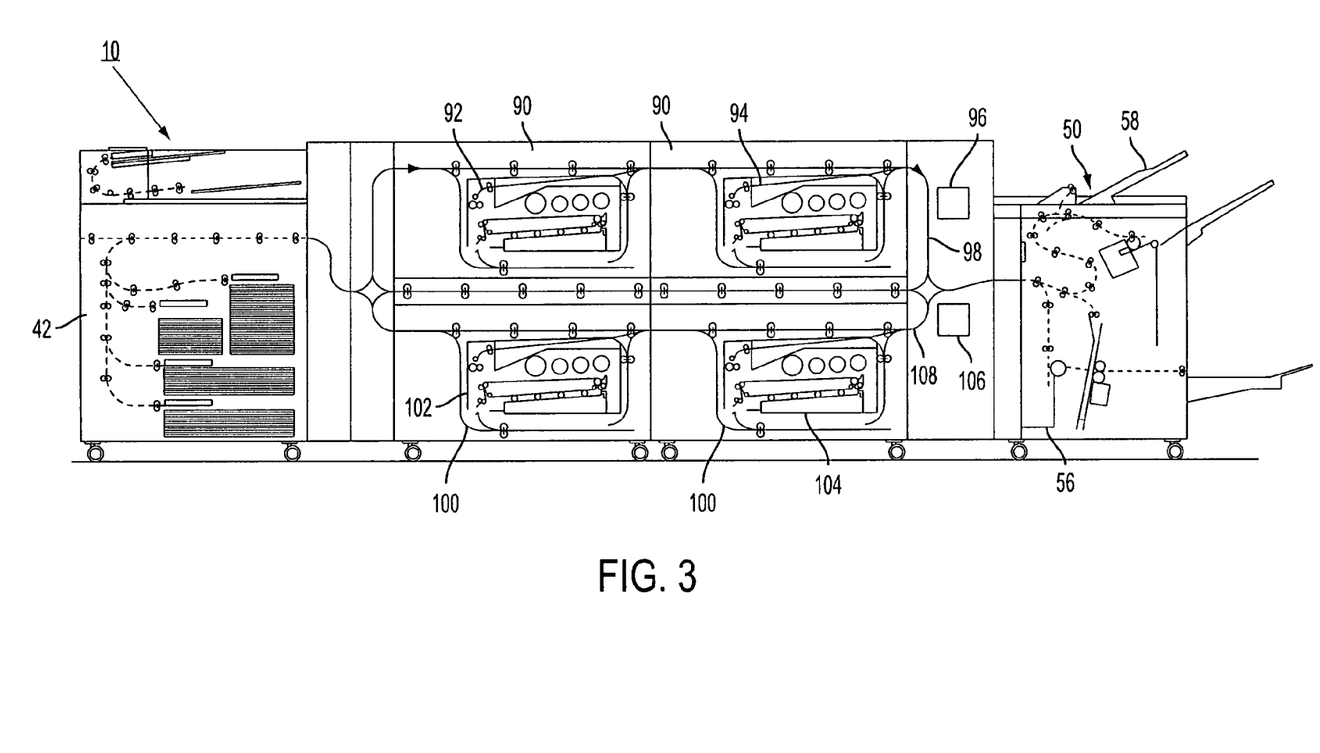
FIG. 3 is a schematic side view of a parallel printing system including two reflectance value obtaining devices according to a second embodiment.

Additionally, it is also contemplated that two or more reflectance value obtaining devices may be provided. For example, as illustrated in FIG. 3, a printing system similar to system 10, except as otherwise noted, includes a first group 90 of printers 92, 94 linked to a first reflectance value obtaining device 96 by a first media highway 98 and a second group 100 of printers 102, 104 linked to a second reflectance value obtaining device 106 by a second media highway 108. The two media highways may be linked to the same feeder 42 and finisher 50 or to a separate feeder and/or finisher.

For any system, one of the printers of a particular modality is designated as a reference or master printer. For purposes of discussion, it will be assumed that each of the printers in the systems of FIGS. 2 and 3 are of the same modality, in this case, CMYK printers, although it will be appreciated that there may be printers of different modalities in the systems. The other printer(s) of the same modality as the master printer, are referred to as slave printers. For purposes of discussion, printer 22 will be considered as the master printer of the system of FIG. 2 and printer 92 will be considered as the master printer of the system of FIG. 3, with the remaining printer(s) considered as slave printers, although it will be appreciated that for these systems, any one of the printers could be designated as the master printer. Where there is more than one sensor (as in FIG. 3), the master printer is linked by pathways of the network 30 of paper pathways to at least two of the sensors 96, 106, and in one embodiment, to all of the sensors in the printing system 10. Additionally, where there is more than one sensor, one of the sensors is designated the master sensor and the other sensor(s) the slave sensor. For purposes of discussion, it will be assumed that sensor 96 is the master sensor and sensor 106 is a slave sensor. The network 30 includes a pathway or pathways 98, 108 by which printed media is transferred between the master sensor 96 and the slave sensor 108.

Each printer 22, 24, 92, 94, 102, 104 includes an image forming component capable of forming an image on the print media. Suitable printers include electrophotographic printers, ink-jet printers, including solid ink printers, thermal head printers that are used in conjunction with heat sensitive paper, and other devices capable of marking an image on a substrate.

In the case of an electrophotographic printer, the image forming component may include a charge retentive surface, such as a photoconductor belt or drum, a charging station for each of the colors to be applied, an image input device which forms a latent image on the photoreceptor, and a toner developing station associated with each charging station for developing the latent image formed on the surface of the photoreceptor by applying a toner to obtain a toner image. A pretransfer charging unit charges the developed latent image. A transferring unit transfers the toner image thus formed to the surface of a print media substrate, such as a sheet of paper where it is fused by a fusing device. Other methods of forming an image are also contemplated.

In one specific embodiment, an automatic color balance control system produces tone values for all four primary colors Cyan (C), Magenta (M), Yellow (Y) and black (K)) by printing patches with one of the printers, measuring colors with the sensor, and automatically readjusting tone reproduction curves (TRCs) for each of the printers until a satisfactory level of accuracy is obtained. The color balance control system may be as described, for example, in above-mentioned U.S. application Ser. No. 09/566,291 or 10/673,688, except as otherwise noted.

Periodically, the printing system is calibrated to achieve color consistency for each of the printers of the same modality. To calibrate the printing system 10, the master printer is first calibrated with the sensor and a target value or set of target values (referred to herein as an aim curve), is generated for the master printer. The aim curve approaches an ideal or desired color response for the printer which, due to constraints of the printer and/or toners used, is not possible to reproduce exactly. The same aim curve is used in the calibration of the other printers. The calibration process will be described first for a system in which all the printers of the same modality are linked to the same sensor (FIG. 2). Calibration of the system of FIG. 3 entails an extra step in which the sensors are calibrated to each other, as will be described in greater detail below.

Figure 4:
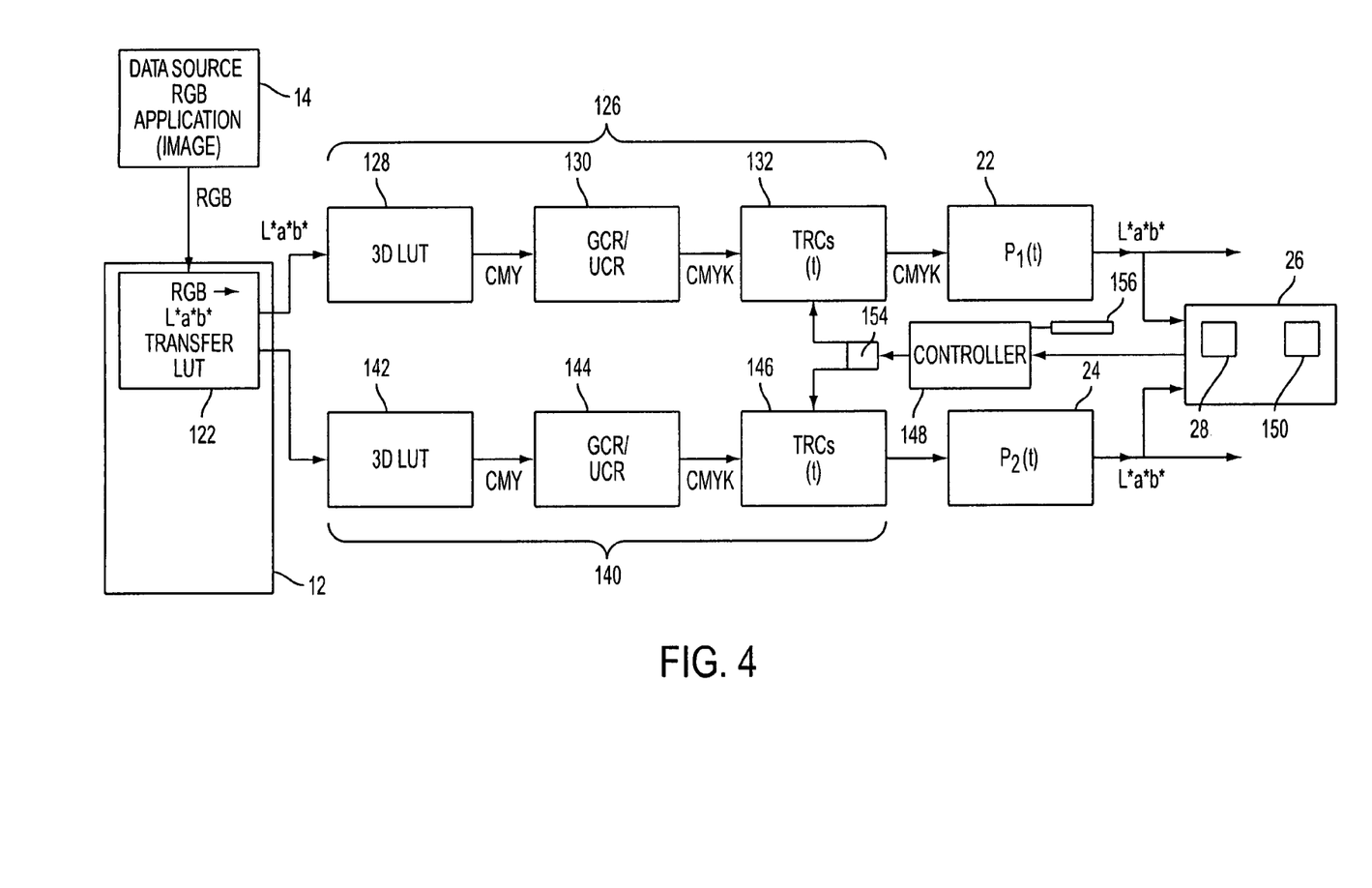
FIG. 4 is a functional block diagram illustrating an exemplary calibration system.

With reference now to FIG. 4, a schematic diagram of an exemplary automatic color balance control system calibrates the outputs of two or more printers 22, 24 which are linked to the same reflectance value obtaining device 26 (for example, as illustrated in FIG. 2) to achieve or improve color consistency between the two outputs. The spectrophotometer 28 may provide spectral information comprising a representative signal of the printed colors of the image. The signal may comprise L*, a*, b* values, XYZ, Luv, etc., values depending on the desired color description. For this description, only L*, a*, b* coordinate space values are used for describing color. A device specific output (represented here as RGB) from the data source 14 is fed to a transfer look up table 122 which converts the image to device independent parameters (here represented as L*, a*, b*). A digital front end (DFE) 126 comprises a conventional image color separation path for processing the input image as specified in device independent parameters into CMYK printing parameters accepted by the printer. A 3D look up table (LUT) 128 transforms the original image in device independent space to CMY space. The CMY space is transformed to CMYK space by under-color removal/gray component replacement (GCR/UCR) at 130. The CMYK space is fed to a Tone Reproduction Curve (TRC) 132 which outputs a modified CMYK to the printer 22. The printer 24 has an analogous DFE 140 with a 3D LUT 142, GCR/UCR 144, and TRCs 146. A common controller 148 controls the operations of both printers 22, 24 and their calibration. It is understood that this procedure to generate the TRCs for each printer is readily extended to multiple printers.

Linearization of the printer consists of calculating the Tone Reproduction Curve during the calibration process. The particular linearized signal resulting from the TRC is converted into a halftone imaging before actual printing by the marking device.

An exemplary test patch pattern used for calibrating a marking system that marks using primary colors C, M, Y, and K marking media, such as ink, toner or the like typically includes a set of CMY gray patches, i.e., patches in which CMY marking media have been combined to make gray, and a set of K gray patches, i.e., patches in which black marking media has been applied at a certain area coverage to yield a "gray" patch (i.e., gray developed with black separation). The CMY gray patches vary from 0-100% coverage, as do the K gray patches. The CMY gray patches and the K gray patches extend in the slow-scan direction of the marking system to be calibrated, e.g., the direction of paper feed. Conceivable variations on the test patterns are that the CMY patches and K patches could be mixed, and/or that the number of K patches could differ from the number of CMY patches.

Optionally, fiducial marks, located adjacent the CMY and K patches, or other triggering systems, are detected by a fiducial mark sensor 150 to trigger measuring of the reflectance of the adjacent patch by a reflectance sensor. The test patch pattern is described in greater detail in above-mentioned U.S. application Ser. No. 10/673,688.

The detailed construction of the TRCs for each printer is primarily effected in two steps: (1) the K-TRC and then (2) the CMY-TRCs. The K-TRC may be determined as disclosed in U.S. application Ser. No. 10/673,688. Such a method may include printing of varying degrees of gray, i.e., a*=b*=0, and K between 0 to 100%, and measuring color L* values (a* and b* values are discarded from this measurement since inaccuracies caused by dropping a* and b* values are taken care of by the CMY-TRCs). A smooth one-dimensional input K to L* function is constructed.

CMY-TRCs from similar test target patterns are obtained except that the test patterns comprise patches having K=0 and a pre-selected number of mixed color patches with appropriate CMY values for a neutral gray (typically, C=M=Y=V, where V=0-100%). For example, for V=50, the measured L*, a*, b* output of the printer should be L*=50 and a*=b*=0, but due to the complex non-linear colorimetric relationships which exist between the input and output values, the output is in the form of a gamut in L*, a*, b* space. Input CMY values are processed through the gray balanced TRCs which can be determined using the methods disclosed in U.S. application Ser. No. 10/613,688.

Specifically, the master printer 22 is calibrated first using an iterative process which includes sending a digital test target pattern of test patches (a "target") to the master printer 22, printing the test patch pattern on the master printer on a sheet of paper (a control page), conveying the control page to the sensor 28, along the network 30 of paper pathways, and determining the L*a*b* values for the patches on the control page. Patches which are designed to be printed with a desired response, e.g., as $L^*a_0b_0$ (neutral gray), will typically have some value of a* and b* because of the constraints of the printer and/or toners used. In the first iteration, the values of a* and b* measured may vary widely from the desired $a_0b_0$ values, e.g., a* may be 10 and b* may be 5. The control system constructs TRCs for the master printer 22 which are intended to bring a* and b* closer to the ideal values of 0. A second copy of the target is printed by the master printer and sent to the sensor. Once again, the values of a* and b* may differ from the ideal zero and new TRCs are generated which are intended to bring the values closer to zero. The iterative process is continued, either for a maximum number of iterations or until the values of a* and b* are as close as possible to the ideal of zero or within an acceptable tolerable range. These non-zero values of a* and b* (which will be referred to as $a_f$ and $b_f$) are designated as the aim values or measured response. For most printers, it is not possible to achieve values of 0 for both a* and b* and thus $a_f$ and $b_f$ will typically have some finite value for any given value of L*. Thus, an aim curve can be generated which includes finite values of a* and b* ($a_f$ and $b_f$) for different values of L*, i.e., L*$a_f b_f$.

Having generated the aim curve and optimum TRCs for achieving the aim curve for the master printer 22, the TRCs are generated for the other printers 24 in the system using a similar iterative process. This involves sending the "target" to the printer 24, printing the target as a control page, and sending the control page to the sensor 28, as for the master printer 22. However, for the slave printers 24, instead of the iterative process being performed with the intent of achieving as close as possible to L*$a_0 b_0$, the control system generates a TRC which is intended to be as close as possible to L*$a_f b_f$. Because the printers 22, 24 are nominally identical and thus suffer similar constraints in their abilities to print neutral gray, the slave printer 24 will be able to achieve a close match to the L*$a_f b_f$ aim curve, and the consistency of the images printed by printers 22 and 24 will be higher than if the control system generates TRCs for both the master printer 22 and the slave printer 24 which are aimed at achieving L*$a_0 b_0$.

Where there several slave printers in the system, the same aim curve of L*$a_f b_f$ values is used for each of the printers in generating the TRCs.

Once the TRCs have been calibrated in this way, periodic recalibration may include fewer iterations of each of the printers, and may use the same aim curve of L*$a_f b_f$ values. For example, recalibration may be conducted periodically, for example, during a normal print job, and include sending the target to each of the printers in turn, printing one control page on each of the printers, determining L*a*b* values with the sensor, comparing the L*a*b* values to the aim curve, and regenerating the TRCs. This allows minor changes in the printer outputs to be corrected to maintain consistency. Periodically, a full calibration is performed, for example, daily and/or when fresh supplies of toner are added.

When more than one reflectance value obtaining device is used, such as shown in FIG. 3, a procedure to calibrate each sensor to the other is performed to assure the correlated output of each reflectance value obtaining device. The procedure is an extension of the one described in U.S. application Ser. No. 10/673,688, noted above. The procedure may include calibrating the reflectance value obtaining devices using the same digital target. In one embodiment, the sensor calibration is performed after the master printer 92 has been calibrated. Calibration of the reflectance value obtaining devices 96, 98 to each other is accomplished, for example, by sending the target to the master printer and printing the test pattern on a sheet of paper, which is sent to the sensor of the first device 96. The same printed sheet (or another printed sheet printed by the master printer using the same digital target) is sent to the slave sensor(s) 106. Correction factors are determined for matching the L*a*b* values of the slave sensor to the L*a*b* values of the master sensor and these correction factors applied to subsequent measurements by the slave sensor. Furthermore, it is understood that this procedure can be extended to multiple reflectance value obtaining devices.

The specific procedures for constructing the TRCs are well understood, and described for example, in application Ser. No. 10/613,688. Briefly, when an actual output has a* and b* values for a target neutral gray, color values need to be adjusted to generate the appropriate neutral gray output which, in this example, L*=50. In this case the C, M and Y could be adjusted to values other than 50 to accommodate the particular printing operation of the subject printing device so that the eventual output would achieve some CMY mix which would have a neutral gray output of L*=50 for the particular printer. The comparison of the target test patches with the measured values of the printer output from the sensor are compared and the difference transformed with a multi-input, multi-output controller for outputting a transformed error vector. The input representing the target colors (again, in this particular example, L* values are between 0 and 100, and a* and b* values are equal to zero) is also fed to a look-up table. This look-up table could be an approximate inverse of the printer (i.e., L*, a*, b*→CMY) or simply L*=C=M=Y.

It will be appreciated that the desired response need not be one dimensional (i.e., neutral gray), but may include color values in more than one dimension. For example, the CMYK values input to the printer may be selected to achieve a desired L*a*b* response where two or more of L*, a*, and b* are non zero (e.g., L*$a_{10} b_0$). The measured response, i.e., aim values, used for the printers will include the L*$a_f b_f$ values for the reference printer which are as close to the desired finite values selected as can reasonably be achieved. The "tone reproduction curves" generated for such multidimensional responses may be two or three dimensional look up tables, as appropriate.

Using the output of the look-up table, first prints of the patches are made. The input target values are then compared to the measured colors to obtain the error. The output of the first summing node is an error signal representing the difference between the desired target color and the output color, which is processed through an integrator, which integrates the weighted errors and outputs corrections to the value that is the output from the look-up table.

Assuming k is the iteration index, the equations for each controlled point [single color] become; $V_i(k)=V_i(k-1)+U_i(k)$; $U_i(k)=K_i E_i(k)$, where $E_i(k)=[L*_i{}^t-L*_i{}^m \ a*_i{}^t-a*_i{}^m \ b*_i{}^t-b*_i{}^m]^T$ and $K_i$ is an $i^{th}$ matrix of dimensions 3×3. $L*_i$, $a*_i$, $b*_i$ ... are color values of $i^{th}$ number of patches with i equals color patch numbers between 1 to N. $V_i(k)$ is a function giving rise to delta for C, M, Y values wherein t indicates target values, m indicates measured values and T indicates matrix transpose. The matrix $K_i$ is predetermined from a first set of input-output characterization of the printer for each control point and is stored in memory in the controller. The L*, a*, b*→CMY values are used to build smooth 1D TRC functions. Since the controller does not normally work very well at the gamut boundaries, it will be desirable to include new ways to shape the TRCs at the boundaries of the TRCs. The desired final shape or response of CMY-TRCs causes the color image to print correctly by making these approximately linear in L* with appropriate smoothing near the boundaries for adjusting highlight and shadow colors.

Periodically, it may be desirable to calibrate the sensors in the system against an outside sensor (a "reference" sensor, not illustrated). According to an exemplary method, a printed reference (also called a hardcopy reference) is created, for example, by sending the digital target to the master printer. The printed reference is removed from the system to be evaluated by the reference sensor. L*a*b* values generated by the reference sensor are compared with those obtained when the printed reference (or another printed page generated by the master printer from the digital target) is evaluated by the sensor 28 (or by the master sensor 96 when two or more sensors are used). Correction factors can then be determined to correct the L*a*b* values of the sensor 28, 96 for deviations from the ideal values of the reference sensor. This procedure ensures that color patches on the printed page have colors close to or equal to the desired L*a*b* values. The reference sensor may be a standard commercially available spectrophotometer, e.g., an X-Rite or GreTag device.

Where there is more than one sensor in the system (FIG. 3) it is not necessary to calibrate the slave sensors 106 against the outside reference sensor as the normal calibration process (described above) ensures that the slave sensors are consistent with the master sensor and thus with the external reference sensor.

With reference once more to FIG. 1, the controller 148, a memory 156, marking devices 22, 24, input/output interface 12, tone reproduction curve (TRC) obtaining device or devices 260 and the reflectance value obtaining device 26, are interconnected by data/control bus 270. The TRC obtaining device 260 includes a gray balance TRC obtaining device 280. It is here understood that more than one device 26 can be present in the printing assembly. Controller 148 controls the operation of other components of the printing system 10 as necessary, performs any necessary calculations and executes any necessary programs for implementing the processes of printing system 10 and its individual components, and controls the flow of data between other components. Memory 156 serves as a buffer for information coming into or going out of the printing system 10, may store any necessary programs and/or data for implementing the functions of printing system 10, and/or may store data at various stages of processing. Furthermore, it should be appreciated that memory 156, while depicted as a single entity, may actually be distributed. Alterable portions of memory 156 are implemented using static or dynamic RAM. However, memory 156 can also be implemented using a floppy disk and disk drive, a write-able optical disk and disk drive, a hard drive, flash memory or the like. The generally static portions of memory 156 are implemented using ROM. However, the static portions can also be implemented using other non-volatile memory, such as PROM, EPROM, EEPROM, an optical ROM disk, such as a CD-ROM or DVD-ROM, and disk drive, flash memory or other alterable memory, as indicated above, or the like. TRC obtaining device 280 obtains gray balanced TRCs in accordance with reflectance values obtained from test patches, as described above.

The reflectance value obtaining device 26 obtains reflectance values from test patches by measuring the test patches with a reflectance sensor 28 in sequence, which may, for example, be a spectrophotometer, so that reflectance sensor 28 can obtain a reflectance value from each patch. The spectrophotometer can be implemented using an LED array as described, for example, in above mentioned U.S. Pat. Nos. 6,584,435 and 6,721,692 or one of various spectrophotometers sold by Gretag MacBeth, ExColor, and X-Rite. Fiducial marks are detected by the fiducial mark sensor 150 to trigger measuring of the reflectance of an adjacent patch by reflectance sensor 28. It is also understood that other sensor triggering mechanisms may be used, such as timing triggering signals by control system 148.

Figure 5:
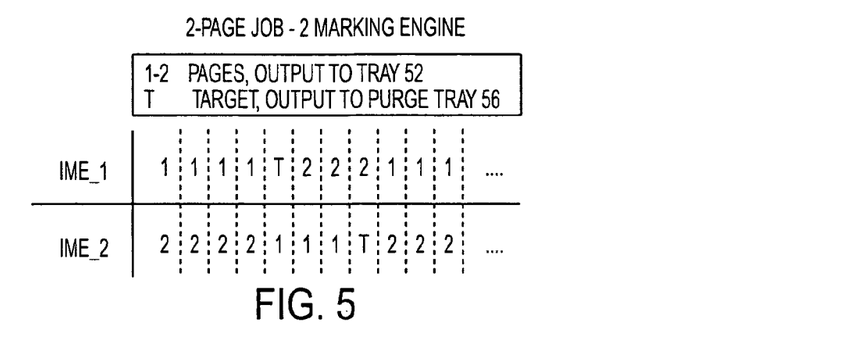
FIG. 5 is an exemplary printing schedule for a printing a two page document using two printers connected to the same finisher, interspersed with test patches (T) on each printer.
Figure 6:
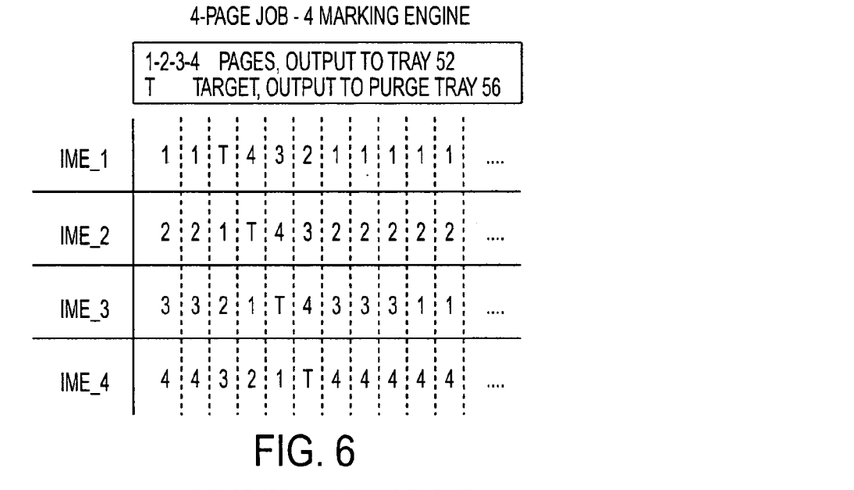
FIG. 6 is an exemplary printing schedule for printing a four page document using four printers connected to the same finisher, interspersed with test patches (T) on each printer.
Figure 7:
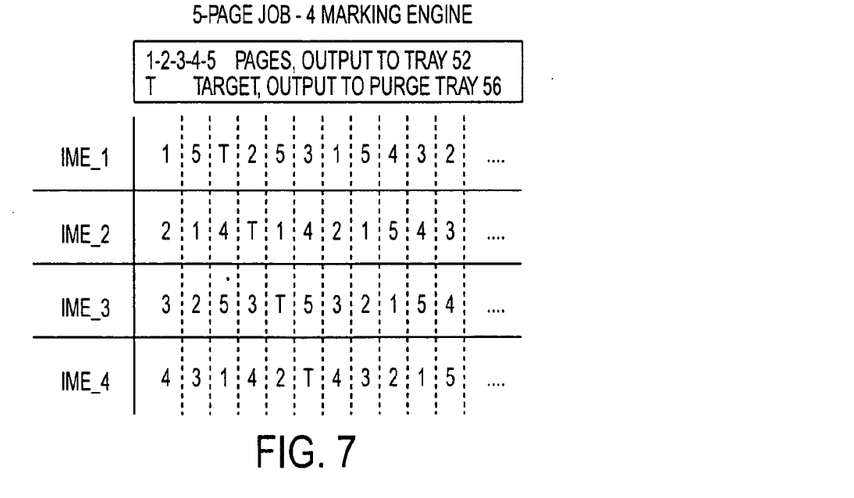
FIG. 7 is an exemplary printing schedule for printing a five page document using four printers connected to the same finisher, interspersed with test patches (T) on each printer.

The calibration or recalibration process can be performed during a normal printing process. By way of illustration, the printing assembly 16 prints multiple copies a two page document. During normal printing, page 1, the first page of the document, is printed by printer 22, and page 2 is printed by printer 24. The pages are collated by finisher 50 as 1-2, 1-2, . . . , etc. At specific times determined by the control system 148, the system sends a target for generation of a control page to test and control the gray balance calibration of the printers. The print sequence in the first printer 22 is stopped to print the control page, and page 1 of the document is instead printed in the second printer 24. After gray balance evaluation, the control page is diverted to the purge tray 56. The first printer 22 then prints page 2 of the document. Then the target for generation of a control page is sent to the second printer 24, and page 1 of the document is again printed in the first printer. The print sequence can be described as 1-2, 1-2, control T-1, 2-1, 2-1, control T-2, 1-2, 1-2, etc. FIG. 5 illustrates the printing process in the presence of control (target) pages where IME_1 and IME_2 are two printers. It will be appreciated that generalization to n-page jobs and m-printers is straightforward. The sequential manner of scheduling control pages and diverting them to the purge tray maintains job integrity. By way of example, FIG. 6 provides an exemplary printing schedule for printing a four page document using four printers (IMEs1-4) connected to the same finisher, interspersed with control pages comprising test patches (T) on each printer. FIG. 7 shows an exemplary printing schedule for printing a five page document using four printers connected to the same finisher, interspersed with control pages comprising test patches (T) on each printer. The control pages are sent to the purge tray 56, allowing the pages of the document to be assembled. In this way, the integrity of the print job output is maintained when performing the calibration of the printer during printing of the document pages.

It will be appreciated that several of the control pages may be used in an extensive calibration process. Thus, for example, the control system may send the target to the master printer so that several control pages are printed before calibrating the slave printers.

It should be understood that each of the circuits, shown in FIG. 1, can be implemented as portions of a suitably programmed general purpose computer. Alternatively, each of the circuits can be implemented as physically distinct hardware circuits within an ASIC, or using a FPGA, a PDL, a PLA or a PAL, or using discrete logic elements or discrete circuit elements. The particular form each of the circuits will take is a design choice and will be obvious and predictable to those skilled in the art.

The disclosed methods may be readily implemented in software using object or object-oriented software development environments that provide portable source code that can be used on a variety of computer or workstation hardware platforms. Alternatively, appropriate portions of the disclosed marking system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The processing systems and methods described above, however, can be readily implemented in hardware or software using any known or later developed systems or structures, devices and/or software by those skilled in the applicable art without undue experimentation from the functional description provided herein together with a general knowledge of the computer arts.

Moreover, the disclosed methods may be readily implemented as software executed on a programmed general purpose computer, a special purpose computer, a micro-processor, or the like. In this case, the methods and systems of this invention can be implemented as a routine embedded on a personal computer or as a resource residing on a server or workstation, such as a routine embedded in a photocopier, a color photocopier, a printer driver, a scanner, or the like. The systems and methods can also be implemented by physical incorporation into a software and/or hardware system, such as the hardware and software system of a photocopier or a dedicated image processing system.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A method for calibrating a printing system comprising a plurality of printers, the method comprising:
    designating one of said plurality of printers as a reference printer;
    defining color values in an L*, a*, b* color space for a target response sought for one or more printed test patches on a control page, the target response color values for each patch including a first colorant value L* and second and third colorant values $a_0$ and $b_0$, which are both zero;
    through a first iterative process, generating a printed control page with said reference printer, said control page including one or more of said test patches, measuring a response of said printed control page, the response including a first color colorant value L* and second and third colorant values a* and b*, the second and third colorant values of the response optionally being non-zero, adjusting a tone reproduction curve for said reference printer based on said measured response to bring a* and b* closer to zero, and repeating said process to approach the target color values $a_0$ and $b_0$ of the response sought;
    designating the measured response $a_f$ and $b_f$ from the reference printer as the target response sought for a second of said printers;
    through a second iterative process, generating a printed control page with the second of said printers, said control page including one or more of said test patches which, when measured, has a measured response, adjusting a tone reproduction curve for said second printer based on said measured response of said second printer, and repeating said process to approach the measured response $a_f$ and $b_f$ of the reference printer.

2. The method of claim 1, wherein said first process and said second process include obtaining reflectance values from said control page.

3. The method of claim 2, wherein said reflectance values for said second process are obtained with the same sensor as said reflectance values for said first process.

4. The method of claim 2, wherein the obtained reflectance values are converted into color values.

5. The method of claim 3, wherein said reference printer, said second printer, and said sensor are connected by a network of paper paths.

6. The method of claim 1, wherein said reference printer and said second printer are linked to at least one of a common print media source and a common finisher.

7. The method of claim 1, wherein the printing system includes first and second sensors, the first sensor measuring reflectance values for control pages generated by at least the reference printer and the second sensor measuring reflectance values for control pages generated by another of the printers, the method further including calibrating the second sensor to the first sensor.

8. The method of claim 7, wherein the calibration of the second sensor to the first sensor includes measuring reflectance values of a first control page with the first sensor and measuring reflectance values of the first control page or of a second control page with the second sensor, the first and second control pages being generated by the same printer using the same tone reproduction curve.

9. The method of claim 1, wherein the calibration of each of the printers includes generating a tone reproduction curve by which input color values are corrected to improve consistency between the printers.

10. The method of claim 1, wherein the target response is a neutral gray formed by combining cyan, magenta and yellow.

11. The method of claim 10, wherein the reference printer is input with a target for generating a plurality of patches having different neutral gray values and wherein the method includes generating a target curve which includes measured responses for each of the plurality of patches.

12. The method of claim 11, wherein the second process is aimed toward achieving the curve.

13. The method of claim 10, wherein at least one of said test patches is a gray developed with black separation.

14. The method of claim 1, wherein the plurality of printers is controlled by a common control system.

15. A method of printing comprising:
    calibrating a printing system comprising a plurality of printers, according to the method of claim 1;
    printing pages of a document using a plurality of said printers; and
    assembling the pages in a common finisher.

16. The method of claim 15, wherein said calibration is performed during the printing of pages.

17. The method of claim 16, wherein the integrity of the print job output is maintained when performing the calibration during printing of the pages.

18. A method for calibrating a printing system comprising a plurality of printers, the method comprising:
    designating one of said plurality of printers as a reference printer;
    defining color values in a color space for a target response sought for each of a plurality of printed test patches on a control page, the target response color values for each printed patch corresponding to a neutral gray with a non-zero first colorant value and second and third colorant values, which are both zero;
    through a first iterative process, generating a printed control page with said reference printer, said control page including said test patches, measuring a response of said printed control page, the response including, for each test patch, a first non-zero color colorant value and second and third colorant values, the second and third colorant values of the response for each patch optionally being non-zero, adjusting a tone reproduction curve for said reference printer based on said measured responses to bring the measured second and third colorant values for each patch closer to zero, and repeating said process to approach the target color values of second and third colorant values of zero for the responses sought;
    designating the measured responses of the second and third colorant values of the patches from the reference printer as the target responses sought for a second of said printers;
    through a second iterative process, generating a printed control page with the second of said printers, said control page including a plurality of said test patches, each of which, when measured, has a measured response, adjusting a tone reproduction curve for said second printer based on said measured response of said second printer, and repeating said process to approach the measured response of the second and third colorant values of the reference printer for each of said plurality of test patches.

* * * * *